US009788269B2

(12) United States Patent
Gokhale

(10) Patent No.: US 9,788,269 B2
(45) Date of Patent: Oct. 10, 2017

(54) SELECTION OF AN ACCESS POINT IN A WIRELESS COMMUNICATIONS NETWORK

(71) Applicant: QUALCOMM Incorporated, San Diego, CA (US)

(72) Inventor: Vikram Gokhale, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/664,703

(22) Filed: Mar. 20, 2015

(65) Prior Publication Data

US 2016/0278007 A1 Sep. 22, 2016

(51) Int. Cl.
| | |
|---|---|
| *H04W 48/20* | (2009.01) |
| *H04W 40/24* | (2009.01) |
| *H04W 76/02* | (2009.01) |
| *H04W 48/16* | (2009.01) |
| *H04W 24/08* | (2009.01) |
| *H04W 48/12* | (2009.01) |
| *H04W 48/18* | (2009.01) |

(52) U.S. Cl.
CPC ........... *H04W 48/20* (2013.01); *H04W 24/08* (2013.01); *H04W 40/244* (2013.01); *H04W 48/16* (2013.01); *H04W 76/02* (2013.01); *H04W 48/12* (2013.01); *H04W 48/18* (2013.01)

(58) Field of Classification Search
CPC .. H04L 12/4604; H04W 84/04; H04W 88/06; H04W 40/244; H04W 76/02; H04W 48/16; H04W 24/08
USPC ........................................................ 370/338
See application file for complete search history.

(56) References Cited

U.S. PATENT DOCUMENTS

| | | | | |
|---|---|---|---|---|
| 7,797,018 B2* | 9/2010 | Chandra | ............... | H04W 88/06 370/310 |
| 8,301,190 B2* | 10/2012 | Chandra | ............... | H04W 88/06 370/310 |
| 9,026,173 B2* | 5/2015 | Chandra | ............... | H04W 88/06 370/310 |
| 9,198,120 B2* | 11/2015 | Liu | ........................ | H04W 48/16 |
| 9,497,680 B1* | 11/2016 | Tran | ....................... | H04W 36/14 |
| 2003/0134642 A1* | 7/2003 | Kostic | .................... | H04L 5/023 455/450 |

(Continued)

FOREIGN PATENT DOCUMENTS

| | | |
|---|---|---|
| EP | 1017197 A2 | 7/2000 |
| WO | WO-2011109052 A1 | 9/2011 |

OTHER PUBLICATIONS

International Search Report and Written Opinion—PCT/US2016/018749—ISA/EPO—May 18, 2016.

*Primary Examiner* — Chi H Pham
*Assistant Examiner* — Robert Lopata
(74) *Attorney, Agent, or Firm* — Haynes and Boone, LLP

(57) ABSTRACT

Systems and methods are disclosed for selecting an access point in a wireless communications network. An example method of selecting an access point in a wireless communications network includes detecting, at a wireless device, a plurality of beacons. Each beacon corresponds to one of a plurality of access points and specifies a frequency band in which its corresponding access point operates. The method also includes selecting, based on the specified frequency bands, an access point of the plurality. The method further includes connecting the wireless device to the selected access point.

20 Claims, 8 Drawing Sheets

(56) References Cited

U.S. PATENT DOCUMENTS

| | | | | |
|---|---|---|---|---|
| 2003/0139197 A1* | 7/2003 | Kostic | H04L 47/10 | 455/525 |
| 2004/0039817 A1* | 2/2004 | Lee | H04W 24/00 | 709/225 |
| 2004/0137908 A1* | 7/2004 | Sinivaara | H04W 48/20 | 455/452.1 |
| 2006/0013398 A1* | 1/2006 | Halasz | H04L 63/1466 | 380/273 |
| 2006/0072602 A1* | 4/2006 | Achanta | H04W 16/10 | 370/431 |
| 2006/0227744 A1* | 10/2006 | Metke | H04W 36/32 | 370/331 |
| 2007/0091864 A1* | 4/2007 | Honjo | H04W 48/20 | 370/338 |
| 2008/0273495 A1* | 11/2008 | Becker | H04W 36/0088 | 370/331 |
| 2009/0103503 A1* | 4/2009 | Chhabra | H04W 48/20 | 370/338 |
| 2009/0135784 A1* | 5/2009 | Horn | H04W 36/0055 | 370/331 |
| 2009/0154416 A1* | 6/2009 | Lu | H04W 48/20 | 370/329 |
| 2010/0054179 A1* | 3/2010 | Meyer | H04W 48/20 | 370/328 |
| 2011/0216692 A1* | 9/2011 | Lundsgaard | H04W 48/20 | 370/328 |
| 2012/0170471 A1* | 7/2012 | Brown | H04W 48/20 | 370/252 |
| 2012/0170557 A1* | 7/2012 | Tsfati | H04W 72/1215 | 370/338 |
| 2012/0294246 A1* | 11/2012 | Cariou | H04W 12/06 | 370/329 |
| 2013/0033995 A1* | 2/2013 | Kraglund | H04W 48/16 | 370/252 |
| 2013/0039275 A1* | 2/2013 | Patil | H04W 48/20 | 370/328 |
| 2013/0115945 A1 | 5/2013 | Holostov et al. | | |
| 2013/0150012 A1* | 6/2013 | Chhabra | H04W 48/16 | 455/418 |
| 2013/0223423 A1 | 8/2013 | Lee et al. | | |
| 2013/0244684 A1* | 9/2013 | Kadous | H04W 4/02 | 455/456.1 |
| 2014/0362776 A1* | 12/2014 | Tian | H04W 48/20 | 370/329 |
| 2015/0055493 A1* | 2/2015 | Suga | H04W 48/20 | 370/252 |
| 2015/0154639 A1* | 6/2015 | Dupont | G06Q 30/0261 | 705/14.53 |
| 2015/0350875 A1* | 12/2015 | Chhabra | H04W 36/0083 | 455/432.1 |
| 2016/0029248 A1* | 1/2016 | Syed | H04W 28/08 | 370/235 |
| 2016/0100352 A1* | 4/2016 | Yunoki | H04W 48/16 | 370/254 |
| 2017/0064622 A1* | 3/2017 | Wang | H04W 24/02 | |

\* cited by examiner

500

| Frequency Band v. Data Rate | 60 GHz | 5GHz | 2.4 GHz |
|---|---|---|---|
| 11ad | 1 | - | - |
| 11ac - VHT80MHz 40MHz 20MHz | - | 2 | 3 |
| 11n - HT40MHz HT20MHz | - | 3 | 4 |

| Crowd v. RSSI | -20 to -40 dBm | -40 to -60 dBm | -60 to -80 dBm |
|---|---|---|---|
| < 10 devices | A | A | B |
| 10-20 devices | A | B | C |
| 20-40 devices | B | C | C |

| (Frequency Band v. Data Rate) v. (Crowd v. RSSI) | I | II | III |
|---|---|---|---|
| 1 | Ultra High Speed | Ultra High Speed | Very High Speed |
| 2 | Very High Speed | High Speed | High Speed |
| 3 | High Speed | Moderate Speed | Moderate Speed |
| 4 | Moderate Speed | Low Speed | Low Speed |

US 9,788,269 B2

SELECTION OF AN ACCESS POINT IN A WIRELESS COMMUNICATIONS NETWORK

FIELD OF DISCLOSURE

The present disclosure generally relates to wireless communications, and more particularly to selecting an access point in a wireless communications network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

An access point may connect a group of wireless devices to a LAN, and the wireless devices may communicate through the access point. In enterprise deployments, WLANs are typically used to provide end users access to network resources and network services and a gateway to the Internet. Institute of Electrical and Electronics Engineers (IEEE) defines a number of architectures for implementing a WLAN. IEEE 802.11 and 802.11x refers to a family of specifications developed by the IEEE for WLAN technology.

BRIEF SUMMARY

Systems and methods are disclosed for selecting an access point in a wireless communications network.

According to some embodiments, a method of selecting an access point in a wireless communications network includes detecting, at a wireless device, a plurality of beacons. Each beacon corresponds to one of a plurality of access points and specifies a frequency band in which its corresponding access point operates. The method also includes selecting, based on the specified frequency bands, an access point of the plurality. The method further includes connecting the wireless device to the selected access point.

According to some embodiments, a system for selecting an access point in a wireless communications network includes a transceiver that detects a plurality of beacons. Each beacon corresponds to one of a plurality of access points and specifies a frequency band in which its corresponding access point operates. The system also includes a memory and one or more processors coupled to the memory and the transceiver. The one or more processors is configured to select, based on the specified frequency bands, an access point of the plurality. The transceiver connects the wireless device to the selected access point.

According to some embodiments, a computer-readable medium has stored thereon computer-executable instructions for performing operations including: detecting, at a wireless device, a plurality of beacons, each beacon corresponding to one of a plurality of access points and specifying a frequency band in which its corresponding access point operates; selecting, based on the specified frequency bands, an access point of the plurality; and connecting the wireless device to the selected access point.

According to some embodiments, an apparatus for selecting an access point in a wireless communications network includes means for detecting a plurality of beacons, each beacon corresponding to one of a plurality of access points and specifying a frequency band in which its corresponding access point operates; means for selecting, based on the specified frequency bands, an access point of the plurality; and means for connecting a wireless device to the selected access point.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 5 provides a scoring table comparing the frequency band and maximum supported data rate associated with an access point, according to some embodiments.

FIG. 6 provides a scoring table comparing the number of devices on a particular channel (Crowd) and the RSSI associated with an access point, according to some embodiments.

Figure 1:
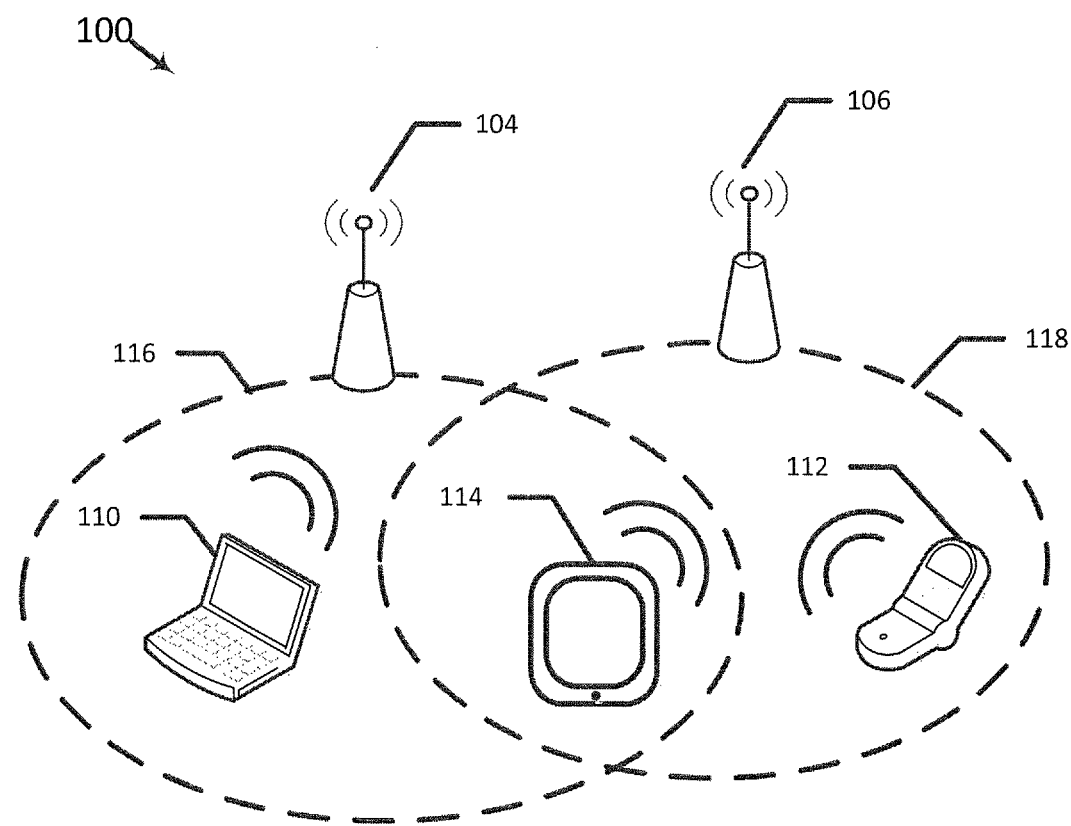
FIG. 1 is a block diagram illustrating a wireless communication system, according to some embodiments.

Embodiments of the present disclosure and their advantages are best understood by referring to the detailed description that follows.

DETAILED DESCRIPTION

I. Overview
II. Example System Architecture
III. Example Wireless Device
IV. Features Associated with Access Points
 A. Access Points Transmit Beacons
 B. Access Point's Associated Frequency Band and Maximum Data Rate
 C. Received Signal Strength Indicator (RSSI)
 D. WLAN Channels
 E. Signal-to-Noise Ratio (SNR)

V. Compare and Select Access Points
VI. Display SSIDs and Select an Access Point
VII. Example Method

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

A WLAN may include various devices that access the wireless network. Access points and client devices (also referred to as stations ("STAs")) are example devices that may access the network. Based on the 802.11 standard, an addressable unit used in the WLAN is considered an STA. In general, an access point serves as a hub or base station for the WLAN, and a client device serves as a user of the WLAN. For example, a client device may be a laptop computer, a personal digital assistant (PDA), a mobile phone, tablet, etc. A client device connects to an access point via a Wi-Fi (e.g., an IEEE 802.11 protocol) compliant wireless link to obtain general connectivity to the Internet or to other wide area networks. In some implementations, a client device may also be used as an access point.

An access point may include, be implemented as, or known as a Radio Network Controller ("RNC"), Base Station Controller ("BSC"), Base Transceiver Station ("BTS"), Base Station ("BS"), Transceiver Function ("TF"), or Radio Router, Radio Transceiver. A client device may include, be implemented as, or known as an access terminal ("AT") a subscriber station, a subscriber unit, a mobile station, a mobile unit, a mobile device, a remote station, a remote terminal, a user terminal, a user agent, a user device, or user equipment. One or more aspects taught herein may be incorporated into a phone (e.g., a cellular phone or smartphone), a portable communication device, a headset, a portable computing device (e.g., a personal data assistant, a laptop, or a tablet), an entertainment device (e.g., a music or video device, or a satellite radio), a gaming device or system, a global positioning system device, or any other suitable device that is configured to communicate via a wireless medium. As discussed above, certain of the devices described herein may implement an IEEE 802.11 standard.

By default, a client device connects to the access point with the strongest received signal strength indicator (RSSI); this is the case even when another access point with a weaker RSSI but having a higher data rate is available. Access points may operate within different frequency bands. For example, IEEE 802.11n supports operation in the 2.4-GHz and 5-GHz frequency bands, and IEEE 802.11ac supports operation in the 5-GHz frequency band. A first access point may operate in the 2.4-GHz frequency band and support 802.11n data rates, and a second access point may operate in the 5-GHz frequency band and support 802.11ac data rates. The client device may receive a stronger RSSI from the first access point than the second access point. Using conventional techniques, even if the second access point supports a higher throughput than the first access point, the client device connects to the first access point, which has a stronger RSSI than the second access point. Accordingly, the client device may lose out on the throughput advantage of connecting to the second access point, which may also operate in a less noisy frequency band than the first access point.

The present disclosure provides a flexible technique that overcomes the noted disadvantages. Rather than solely use the RSSI to determine which access point to connect to, a client device may use other features of an access point. For example, the client device may select access points to which to connect based on a frequency band in which the access points operate. In some embodiments, a method of selecting an access point in a wireless communications network includes detecting, at a mobile device, a beacon of a plurality of access points. Each beacon specifies a frequency band in which an access point operates. The method also includes selecting, based on the specified frequency bands, an access point. The method further includes connecting the wireless device to the selected access point.

Additionally, a user interface may provide the user with information about the throughput of an access point. The user interface may indicate the total over-the-air throughput each access point can provide if the wireless device connects to the access point. The throughput may depend on, for example, the RSSI of the access point, the maximum data rate supported by the access point, the frequency band in which the access point operates, and the WLAN crowd in the channel at which the access point is located.

II. Example System Architecture

FIG. 1 is a block diagram illustrating a wireless communication system 100, according to some embodiments. Wireless communication system 100 may operate pursuant to a wireless networking standard (e.g., 802.11 or 802.11x family). Wireless communication system 100 includes access points 104 and 106, which may communicate with client devices 110, 112, and/or 114. Client devices 110, 112, and/or 114 may be mobile devices. Although two access points and three client devices are illustrated, other embodiments including more than two access points and/or fewer or more than three client devices are within the scope of the present disclosure.

A variety of processes and methods may be used for transmissions in wireless communication system 100 between access points 104 and 106 and client devices 110, 112, and 114. For example, signals may be sent and received between access point 104, 106 and client device 110, 112, and/or 114 in accordance with OFDM/OFDMA (Orthogonal frequency-division multiple access) techniques. In this example, wireless communication system 100 may be referred to as an OFDM/OFDMA system. Alternatively, signals may be sent and received between access point 104, 106 and client device 110, 112, and/or 114 in accordance with CDMA (Code division multiple access) techniques. In this example, wireless communication system 100 may be referred to as a CDMA system.

A communication link that facilitates transmission from access point 104, 106 to one or more of client device 110, 112, and 114 may be referred to as a downlink, and a communication link that facilitates transmission from one or more of client device 110, 112, and 114 to access point 104, 106 may be referred to as an uplink (UL). Alternatively, the downlink may be referred to as a forward link or a forward channel, and the uplink may be referred to as a reverse link or a reverse channel.

A radio card is referred to by the 802.11 standard as a station (STA) and can reside in each of access points 104 and 106 and client devices 110, 112, and 114. An access point may be thought of as a hub with a radio card and an antenna. Access point 104, 106 may be associated with half-duplex communications that allow for only one radio card to transmit at any given time. Access point 104, 106 may act as a base station and provide wireless communication coverage in a basic service area encompassing a set of client devices. The radio card inside an access point contends for the half-duplex medium similarly to how the client station radio cards contend for the medium.

A radio card that is not used in an access point may be referred to as a client station (or a client device). Client device radio cards may be used in laptops, tablets, scanners, phones, and many other mobile devices. If a client device has a layer 2 connection with an access point, the client station and access point are known as associated.

A Service Set Identifier (SSID) is the human readable name associated with an 802.11 wireless network. An SSID may also be referred to as the wireless "network name" and can be shared by multiple access points. The SSID may be the logical WLAN name and may be a configurable setting on all radio cards, including access points and client stations. A Basic Service Set (BSS) is a set of stations that can communicate with each other. The communicating devices that make up a BSS are a single access point and one or more client devices. For example, access point 104 along with its associated client devices 110 and 114 may be included in a BSS 116. Additionally, access point 106 along with its associated client devices 112 and 114 may be included in a BSS 118. A BSS Identifier (BSSID) uniquely identifies a specific access point and is in the same format as a media access control (MAC) address. The BSSID may be the MAC address of the radio network interface in an access point. An Extended Service Set (ESS) is a set of one or more interconnected BSSs connected by a distribution system medium (DSM). An ESS may be a collection of multiple access points and their associated client devices, all united by a single DSM. An example ESS may include access points 104 and 106 and client devices 110, 112, and 114. An Extended Service Set Identifier (ESSID) can be thought of as a group of BSSIDs that share the same Layer 2 network and the same SSID.

III. Example Wireless Device

Figure 2:
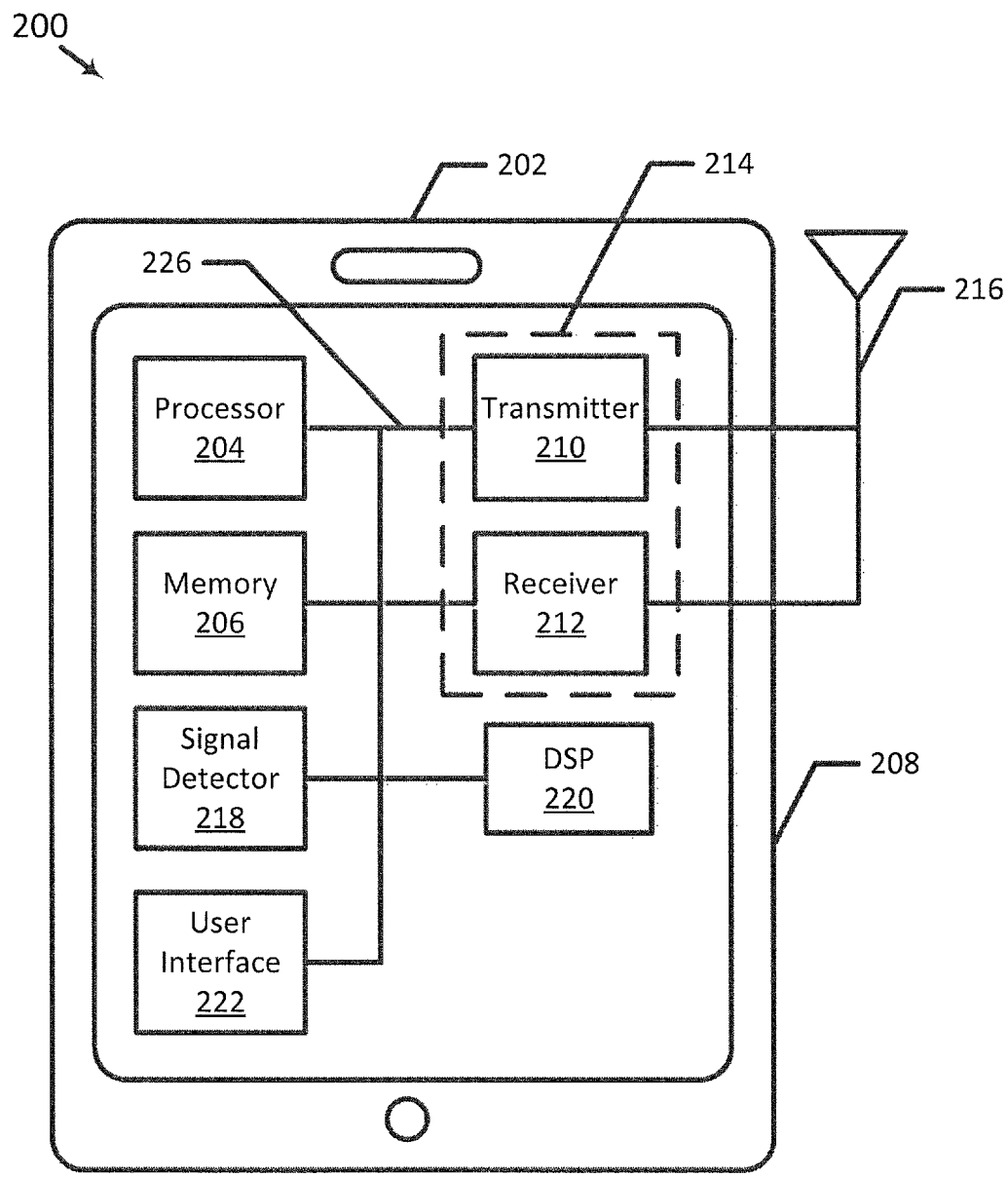
FIG. 2 illustrates various components that may be utilized in a wireless device that may be employed within the wireless communication system.

FIG. 2 illustrates various components that may be utilized in a wireless device 202 that may be employed within wireless communication system 100. Wireless device 202 is an example of a device that may be configured to implement the various methods described herein. Wireless device 202 may include access point 104, 106 and/or client devices 110, 112, and 114. Wireless device 202 may be any type of device having wireless capabilities.

Wireless device 202 may include a processor 204 that controls operation of wireless device 202. Processor 204 may also be referred to as a central processing unit (CPU). A memory 206, which may include both read-only memory (ROM) and random access memory (RAM), provides instructions and data to processor 204. A portion of memory 206 may also include non-volatile random access memory (NVRAM). Processor 204 typically performs logical and arithmetic operations based on program instructions stored within memory 206. The instructions in memory 206 may be executable to implement the methods described herein.

Processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing system may also include machine-readable media for storing software. Software may include instructions that when executed by the one or more processors, cause the processing system to perform the various functions described herein.

Wireless device 202 may also include a housing 208 including a transmitter 210 and a receiver 212 to allow transmission and reception of data between wireless device 202 and a device remote from wireless device 202. Transmitter 210 and receiver 212 may be combined into a transceiver 214 that may be built into a network interface card (NIC). An antenna 216 may be attached to housing 208 and electrically coupled to transceiver 214. Wireless device 202 may also include (not shown) multiple transmitters, multiple receivers, multiple transceivers, and/or multiple antennas.

Wireless device 202 may also include a signal detector 218 that may be used in an effort to detect and quantify the level of signals received by transceiver 214. Signal detector 218 may detect such signals as total energy, energy per subcarrier per symbol, power spectral density, and other signals. Wireless device 202 may also include a digital signal processor (DSP) 220 for use in processing signals. DSP 220 may be configured to generate a data unit for transmission. In some aspects, the data unit may include a physical layer data unit (PPDU). In some aspects, the PPDU is referred to as a packet.

Wireless device 202 may further include a user interface 222 in some aspects. User interface 222 may include a keypad, a microphone, a speaker, and/or a display. User interface 222 may include any element or component that conveys information to a user of wireless device 202 and/or receives input from the user.

Various components of wireless device 202 may be coupled together by a bus system 226. Bus system 226 may include a data bus, for example, as well as a power bus, a control signal bus, and a status signal bus in addition to the data bus. It should be noted that the specific configuration of buses and communication interfaces between the different components shown in FIG. 2 is merely an example, and other configurations of computing devices with the same or different components may be used to implement the techniques of this disclosure.

Those of skill in the art will appreciate the components of wireless device 202 may be coupled together or accept or provide inputs to each other using some other mechanism. Although a number of separate components are illustrated in FIG. 2, those of skill in the art will recognize that one or more of the components may be combined or commonly implemented. For example, processor 204 may be used to implement not only the functionality described above with respect to processor 204, but also to implement the functionality described above with respect to signal detector 218 and/or DSP 220. Further, each of the components illustrated in FIG. 2 may be implemented using a plurality of separate elements.

IV. Features Associated with Access Points

A. Access Points Transmit Beacons

Figure 3:
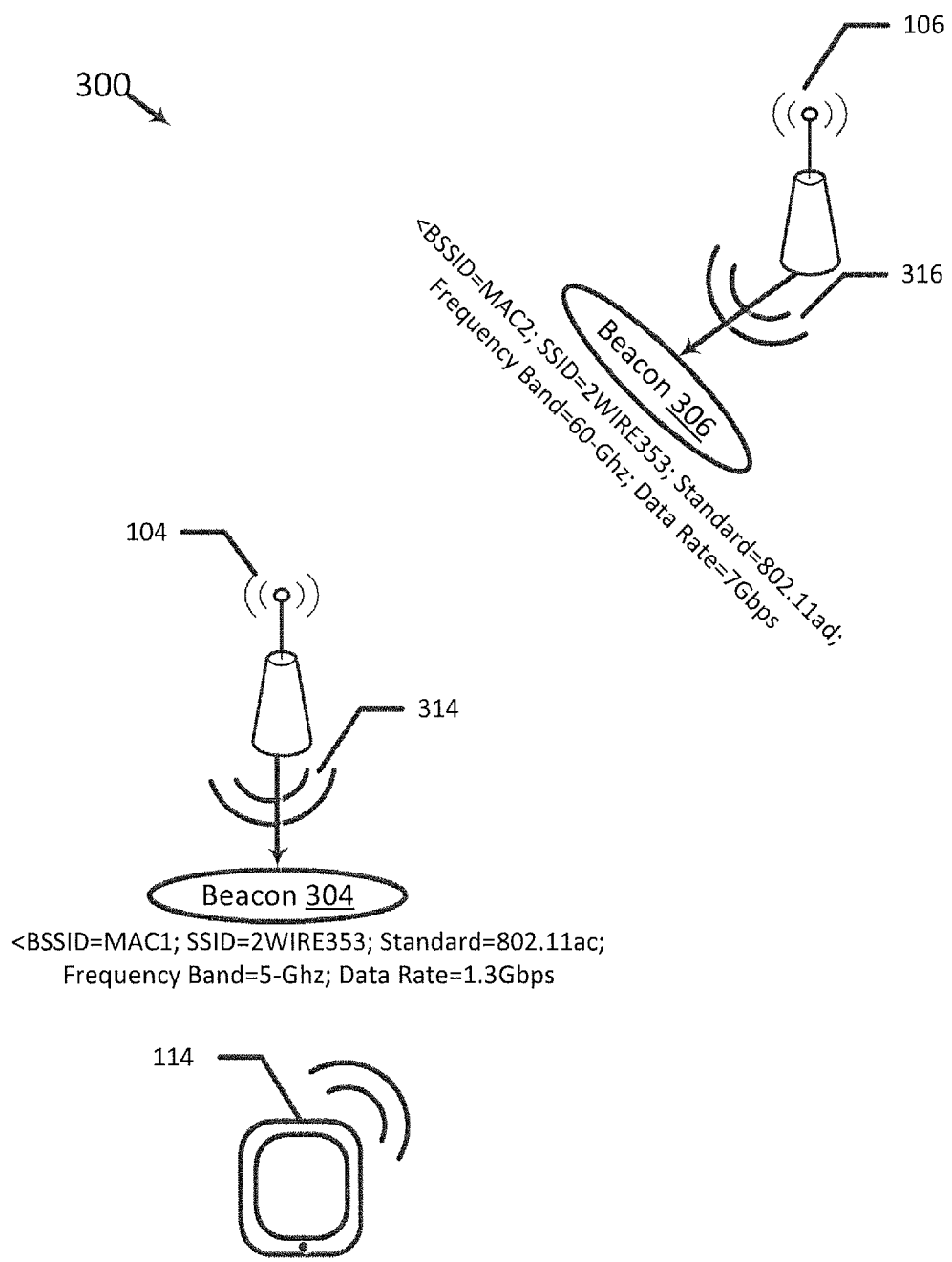
FIG. 3 is a block diagram illustrating a client device detecting beacons broadcasted from a plurality of access points, according to some embodiments.

FIG. 3 is a block diagram illustrating client device 114 detecting beacons broadcasted from access points 104 and 106, according to some embodiments. Access point 104, 106 transmits beacon 304, 306, respectively, which is a radio broadcast that advertises the wireless settings for a specific SSID associated with the access point. A beacon is a properties list that is transmitted by an access point to broadcast the access point's presence, and describes to the client devices what capabilities the access point has and to which network the access point can provide access. Access points make their networks known by sending beacons periodically (e.g., 100 millisecond intervals).

Client device 114 detects beacons 304 and 306 transmitted by access points 104 and 106, respectively. Alternatively, rather than wait to detect a beacon, client device 114 may send a probe request that carries the capabilities of the client device. In sending the probe request, client device 114 asks the access points that hear the probe request whether they provide access to a particular SSID. Client device 114 may broadcast probe requests and receive a probe response responsive to the probe request. Probe responses carry almost identical information to beacons, but are dedicated to the client device that sent the corresponding probe request. Although client device 114 is illustrated as detecting beacons 304 and 306, it should be understood that the device that detects beacons can be any device that supports wireless communications protocols.

Client device 114 may use the information specified in beacons 304 and 306 to select an access point (e.g., access point 104 or 106) to which to connect. Beacon 304 identifies access point 104 (e.g., by its MAC address or the BSSID associated with access point 104), specifies the SSID associated with access point 104, and specifies that access point 104 provides a client device access to the network with an SSID of "2WIRE353." Beacon 304 also specifies that access point 104 supports the 802.11ac wireless networking standard, operates in the 5-GHz frequency band, and supports a maximum data rate of 1.3 gigabits per second (Gbps). Beacon 306 identifies access point 106 (e.g., by its MAC address or the BSSID with access point 106), specifies the SSID associated with access point 106, and specifies that access point 106 provides a client device access to the network with an SSID of "2WIRE353." Beacon 306 also specifies that access point 106 supports the 802.11ad wireless networking standard, operates in the 60-GHz frequency band, and supports a maximum data rate of 7 Gbps. Each of these features is further discussed below.

B. Access Point's Associated Frequency Band and Maximum Data Rate

Access point 104, 106 has its own frequency band(s) in which the access point operates and a maximum data rate that the access point supports. A client device may take the frequency bands in which access points operate into consideration when determining to which access point to connect. It may be desirable for a client device to connect to an access point operating in a higher frequency band than another available access point. Additionally, the speed at which wireless devices are designed to exchange information is known as the data rate. Data rates differ depending on, for example, the wireless standard, spread spectrum type, or Physical Layer technology in use. Data rates may not accurately represent the amount of information that is actually being transferred between devices in a wireless network.

An access point specifies its maximum supported data rate in the beacon. An access point's data rate may depend on the access point's antenna configuration. Referring back to FIG. 2, antenna 216 provides two functions in a communication system. When connected to transmitter 210 and to process and transmit data, antenna 216 collects the alternating current (AC) signal from transmitter 210 and directs, or radiates, the radio frequency (RF) waves away from antenna 216 in a pattern specific to the antenna type. When connected to receiver 212 and to process received data, antenna 216 takes the RF waves that it receives through the air and directs the AC signal to receiver 212. Receiver 212 converts the AC signal to bits and bytes.

If an access point has an antenna configuration of one-cross-one, the access point can receive on one antenna and transmit on one antenna. Of course, an access point having an antenna configuration of one-cross-one does not necessarily have (but may have) two antennas. The access point may have one antenna that is time divided to receive and transmit on the same antenna. Similarly, an access point having an antenna configuration of two-cross-two can receive on two antennas and transmit on two antennas. An access point with a two-cross-two antenna configuration may have double throughput compared to an access point with a one-cross-one antenna configuration. The standard supported by an access point (e.g., 802.11g, 802.11n, etc.) may be associated with the antenna configuration. A client device may take the maximum data rates supported by access points into consideration when determining to which access point to connect. It may be desirable for a client device to connect to an access point having a greater maximum data rate than another available access point.

Figure 4:
FIG. 4 illustrates a table including wireless networking standards, frequency bands, and maximum data rates associated with access points, according to some embodiments.

FIG. 4 illustrates a table 400 including wireless networking standards, frequency bands, and maximum data rates associated with access points, according to some embodiments. As illustrated in FIG. 4, an access point that supports the 802.11a wireless network standard may operate in the 5-GHz frequency band and support a maximum data rate of 54 Megabits per second (Mb/s). Additionally, an access point that supports the 802.11b wireless network standard may operate in the 2.4-GHz frequency band and support a maximum data rate of 11 Mb/s. Additionally, an access point that supports the 802.11g wireless network standard may operate in the 2.4-GHz frequency band and support a maximum data rate of 54 Mb/s. Additionally, an access point that supports the 802.11n wireless network standard may operate in the 2.4-GHz frequency band and support a maximum data rate of hundreds of Mb/s depending on the configuration.

C. Received Signal Strength Indicator (RSSI)

Referring back to FIG. 3, client device 114 may calculate a received signal strength indicator (RSSI) based on input signals 314 and 316 transmitted by access points 104 and 106, respectively. The RSSI may be based on the signal strength and signal quality. RSSI is a measure of the amount of signal strength that arrives at client device 114 and is measured in units of dBm (decibels relative to a milliwatt). RSSI values are negative and represent the level of signal loss that can be experienced en route with client device 114 still able to receive the signal correctly. A correlation between signal quality and the distance between client device 114 and the access point typically exists. The greater the RSSI value (the closer it is to zero), the closer client device 114 may be to the access point that transmitted the signal.

A client device may take the RSSIs associated with access points into consideration when determining to which access point to connect. It may be desirable for a client device to connect to an access point having a stronger RSSI (greater dBm) than another available access point D. WLAN Channels Depending on the wireless networking standard supported by an access point, the access point has a particular number of channels in which it operates. A channel may, for example, have a bandwidth of about 20 or 40 megahertz (MHz), depending on the wireless networking standard supported by the access point. For example, the 2.4-GHz frequency band may have three nonoverlapping 20-MHz channels and may be saturated with Wi-Fi and non-Wi-Fi interference sources. In contrast, the 5-GHz frequency band may provide up to 24 nonoverlapping 20-MHz channels or fewer bonded 40 MHz channels. Fewer devices use the 5-GHz frequency band compared to the 2.4-GHz frequency band and thus may be less noisy than the 2.4-GHz frequency band.

Each channel may have a number of devices (e.g., access points and client devices) connected to it. For example, a channel may have four access points and five client devices connected to it. Each of the devices may be allotted 20 MHz and share use of the channel, which may be time divided between the devices.

A client device may take the number of devices connected to a channel to which particular access points are connected into consideration when determining to which access point to connect. It may be desirable for a client device to connect to an access point associated with a channel having fewer devices than another available access point.

E. Signal-to-Noise Ratio (SNR)

The signal-to-noise (SNR) ratio refers to the ratio of the signal (e.g., signal 314 or 316) to the surrounding RF noise present in the environment. In other words, SNR is a comparison of the amount of signal as compared to the surrounding noise. If the level of noise is too close to the level of signal, it may be difficult for the signal to be distinguished from the noise and understood by the client device. The total noise is related to, for example, a direct measure of the bit error rate or packet error rate, which may also depend on the number of WLAN devices and/or the number of non-WLAN devices radiating on that channel.

In FIG. 3, client device 114 may calculate the SNR for one or more WLAN channels. In an example, client device 114 calculates the SNR based on a packet error rate. The higher the packet error rate, the more noisy the channel. Client device 114 may calculate the packet error rate based on the number of retransmissions that client device 114 performs. For example, if client device 114 transmits a packet to access point 104 and does not receive an acknowledgement of the packet from the access point, client device 114 may retransmit that packet to access point 104.

A client device may take the SNRs associated with access points into consideration when determining to which access point to connect. It may be desirable for a client device to connect to an access point associated with a smaller SNR.

V. Compare and Select Access Points

Client device 114 may compare one or more of the features associated with an access point (e.g., frequency band in which the access point operates, data rate supported by the access point, RSSI based on a signal from the access point, and a number of devices connected to the channel to which the access point is connected).

Client device 114 may generate a score based on the compared features. FIG. 5 depicts a table 500 of example scores depending on the frequency band and maximum data rate associated with an access point, according to some embodiments. In accordance with table 500, if an access point supports the 802.11ad wireless networking standard and operates in the 60-GHz frequency band, the access point is given a score of 1. Additionally, if an access point supports the 802.11ac wireless networking standard (with a very high throughput (VHT) of 80 MHz, 40 MHz, or 20 MHz) and operates in the 5-GHz frequency band, the access point is given a score of 2.

Additionally, if an access point supports the 802.11ac wireless networking standard (with a VHT of 80 MHz, 40 MHz, or 20 MHz) and operates in the 2.4-GHz frequency band, the access point is given a score of 3. Additionally, if an access point supports the 802.11n wireless networking standard (with a high throughput (HT) of 40 MHz or 20 MHz) and operates in the 5-GHz frequency band, the access point is given a score of 3. Additionally, if an access point supports the 802.11ac wireless networking standard (with a VHT of 80 MHz, 40 MHz, or 20 MHz) and operates in the 2.4-GHz frequency band, the access point is given a score of 4.

In some embodiments, client device 114 selects an access point based on the frequency band specified in beacons 304 and 306. In an example, of access points 104 and 106, client device 114 may select the access point having the highest frequency band. In this example, client device 114 may select access point 106 operating in the 60-GHz frequency band, which is greater than the 5-GHz frequency band in which access point 104 operates. Client device 114 may then connect to access point 106, the selected access point. In this example, client device 114 connects to access point 106 even though it has a weaker RSSI than access point 104. Despite this, access point 106 may provide client device 114 with higher throughput than access point 104. It should be understood that client device 114 may also take any of the other factors associated with the access points into consideration when determining to which access point to connect. For example, client device 114 may select an access point based on the frequency band and maximum data rate specified in beacons 304 and 306.

In some embodiments, client device 114 selects an access point based on the maximum data rate specified in beacons 304 and 306. In an example, of access points 104 and 106, client device 114 may select the access point having the highest maximum data rate. In this example, client device 114 may select access point 106 having a maximum data rate of 7 Gbps, which is greater than the maximum data rate of 1.3 Gbps supported by access point 104. Client device 114 may then connect to access point 106, the selected access point. In this example, client device 114 connects to access point 106 even though it has a weaker RSSI than access point 104. Despite this, access point 106 may provide client device 114 with higher throughput than access point 104.

FIG. 6 provides a scoring table 600 comparing the number of devices on a particular channel (Crowd) and the RSSI associated with an access point, according to some embodiments. In accordance with table 600, if an access point is connected to a channel having fewer than 10 connected devices and is associated with an RSSI between −20 and −40 dBm or with an RSSI between −40 and −60 dBm, the access point should be given a score of I. Similarly, if an access point is connected to a channel having 10-20 connected devices and is associated with an RSSI between −20 and −40 dBm, the access point should be given a score of I.

Additionally, if an access point is connected to a channel having 20-40 connected devices and is associated with an RSSI between −20 and −40 dBm, the access point should be given a score of II. Similarly, if an access point is connected to a channel having 10-20 connected devices and is associated with an RSSI between −40 and −60 dBm, the access point should be given a score of II. Similarly, if an access point is connected to a channel having fewer than 10 connected devices and is associated with an RSSI between −60 and −80 dBm, the access point should be given a score of II. Additionally, if an access point is connected to a channel having 20-40 connected devices and is associated with an RSSI between −40 and −60 dBm or with an RSSI between −60 and −80 dBm, the access point should be given a score of III. Similarly, if an access point is connected to a channel having 10-20 connected devices and is associated with an RSSI between −60 and −80 dBm, the access point should be given a score of III.

In some embodiments, client device 114 selects, based on the number of devices on a particular channel associated with one or more access points, an access point. In an example, out of a choice of access points 104 and 106, client device 114 may select the access point having the least number of devices on a channel associated with the access point. It should be understood that client device 114 may also take any of the other factors associated with the access points into consideration when determining to which access point to connect. For example, client device 114 may select an access point based on the RSSI and number of devices on a particular channel associated with one or more access points. In another example, client device 114 may select an access point based on the RSSI, number of devices on a particular channel associated with one or more access points, and frequency band and maximum data rate specified in the beacons.

For each access point of the plurality, client device 114 may calculate a speed score based on the specified frequency bands, the specified data rates, the RSSI associated with the access point, and/or the number of wireless devices connected to a channel associated with the access point. Client device 114 may use any combination of these features associated with access point to determine the speed score of an access point.

Figure 7:
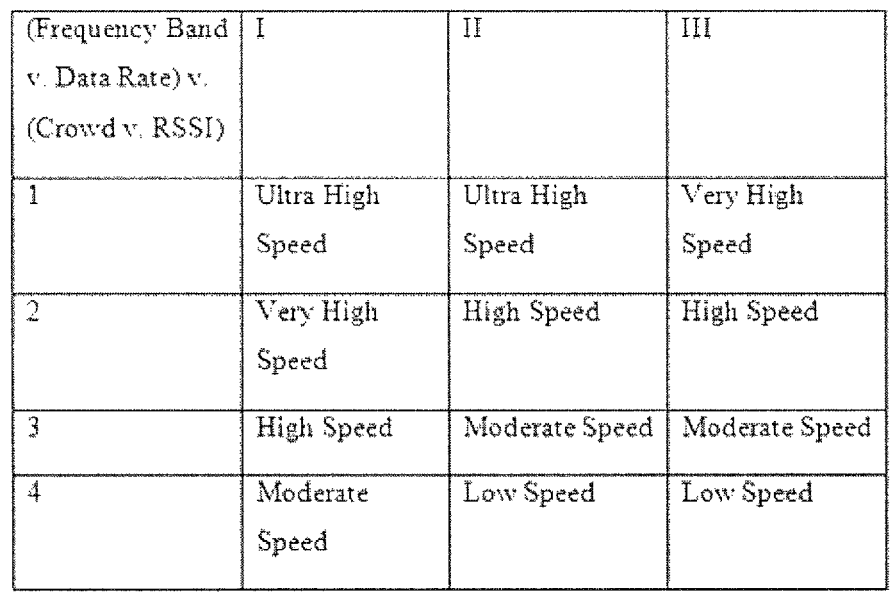
FIG. 7 provides an example scoring table that determines a speed score associated with an access point, according to some embodiments.

FIG. 7 provides an example scoring table 700 that determines a speed score associated with an access point, according to some embodiments. In accordance with table 700, if an access point is given scores of "1" and "I" or scores of "1" and "II," the access point has an "Ultra High Speed." Additionally, if an access point is given scores of "1" and "III" or scores of "2" and "I," the access point has a "Very High Speed." Additionally, if an access point is given scores of "2" and "II," scores of "2" and "III," or scores of "3" and "I," the access point has a "High Speed." Additionally, if an access point is given scores of "3" and "II," scores of "3" and "III," or scores of "4" and "I," the access point has a "Moderate Speed." Additionally, if an access point is given scores of "4" and "II" or scores of "4" and "µl," the access point has a "Low Speed." These keywords may be used to convey to a speed score and the overall throughput that the access point can deliver.

The scoring system is an example scoring system and may be different from that illustrated. Additionally, the scoring system may reside in the firmware of client device 114 and be updated with software updates, or may be included in new firmware that is incorporated in client device 114. In an example, the scoring system may be updated such that the RSSI in FIG. 6 is split up into finer levels (e.g., −20 DBM to −30 DMB).

VI. Display SSIDs and Select an Access Point

Figure 8:
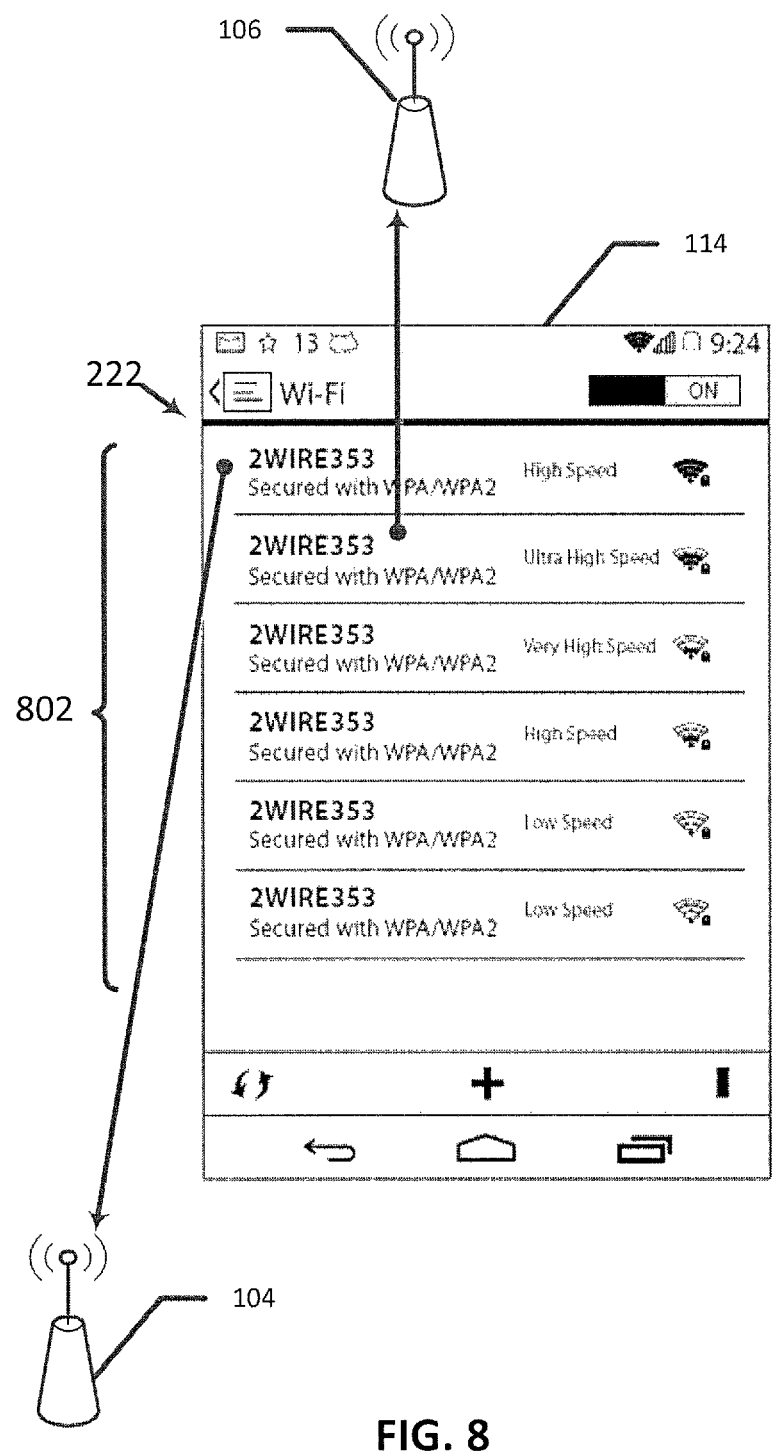
FIG. 8 is an illustration of a user interface displaying a scan list including one or more available access points to which a client device may connect, according to some embodiments.

The access points and their speed scores may be displayed to the user. FIG. 8 is an illustration of a user interface 222 displaying a scan list 802 including one or more available access points to which client device 114 may connect, according to some embodiments. Scan list 802 includes six access points with the same SSID but different MAC addresses. The access points listed in scan list 802 may be any access point that is within a threshold proximity to client device 114. In an example, some of the access points in scan list 802 are in the same ESS. In another example, some of the access points in scan list 802 are not in the same ESS.

User interface 222 may display a few lines of concentric arc according to the RSSI of the associated access points. For example, access point 104 associated with the "2WIRE353" network may have three concentric arcs and thus a stronger RSSI than access point 104, which is also associated with the "2WIRE353" network and has two concentric arcs.

User interface 222 may also provide a visual indication of the speed score associated with SSI. Client device 114 may display the SSI and speed score associated with each access point. In keeping with the above example, access point 104 was given a speed score of "High Speed," and access point 106 was given a speed score of "Ultra High Speed." Accordingly, the information displayed on user interface 222 includes the RSSI along with additional information that is based on additional features associated with access point (e.g., the frequency band in which an access point operates, the maximum data rate supported by an access point, and the crowd associated with an access point).

In some embodiments, client device 114 automatically selects the access point with the highest speed score and connects to the selected access point. In some embodiments, scan list 802 is displayed on user interface 222 for a user to view, and the user selects an access point by touching a location on user interface 222 associated with that access point. User interface 222 may receive a user input selecting an access point, and client device 114 may select the access point based on the user input.

In an example, scan list 802 may include access points in an order based on their data rate or throughput. For example, the access point with the highest speed score is displayed first, then access point with the next highest speed score is displayed second, and so on.

VII. Example Method

Figure 9:
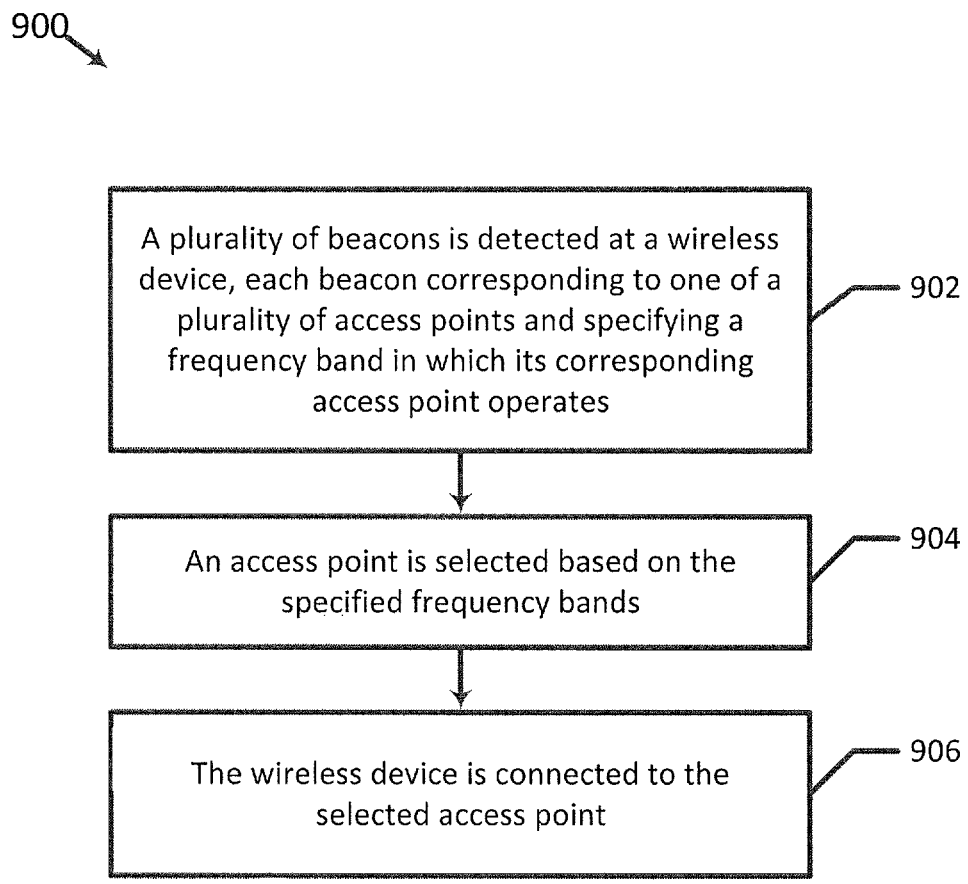
FIG. 9 is a flowchart illustrating a method of selecting an access point in a wireless communications network, according to some embodiments.

FIG. 9 is a flowchart illustrating a method 900 of selecting an access point in a wireless communications network, according to some embodiments. Method 900 is not meant to be limiting and may be used in other applications.

At an action 902, a plurality of beacons is detected at a wireless device, each beacon corresponding to one of a plurality of access points and specifying a frequency band in which its corresponding access point operates. In an example, transceiver 214 detects, at client device 114, beacons 304 and 306 transmitted from access points 104 and 106, each beacon corresponding to one of a plurality of access points and specifying a frequency band in which its corresponding access point operates. At an action 904, an access point of the plurality is selected based on the specified frequency bands. In an example, processor 204 selects, based on the specified frequency bands, access point 106 of the plurality. At an action 906, the wireless device is connected to the selected access point. In an example, transceiver 214 connects client device 114 to access point 106.

In some embodiments, actions 902-906 may be performed for any number of times client device 114 desires to connect to a network and thus to connect to an access point. It is also understood that additional processes may be inserted before, during, or after actions 902-906 discussed above. It is also understood that one or more of the actions of method 900 described herein may be omitted, combined, or performed in a different sequence as desired.

As discussed above and further emphasized here, FIGS. 1-9 are merely examples, which should not unduly limit the scope of the claims. In various embodiments of the present disclosure, execution of instruction sequences (e.g., actions 902-906 in FIG. 9) to practice the present disclosure may be performed by computing device 102. In various other embodiments of the present disclosure, a plurality of computing devices may be coupled by a communications link to a network (e.g., such as a local area network (LAN), wireless local area network (WLAN), public switched telephone network (PTSN), and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components including software, firmware, hardware, and/or all without departing from the spirit of the present disclosure. Where applicable, the various hardware components, software components, and/or firmware components set forth herein may be separated into sub-components including software, firmware, hardware, or all without departing from the spirit of the present disclosure. In addition, where applicable, it is contemplated that software components may be implemented as hardware components, and vice-versa. Where applicable, the ordering of various steps or actions described herein may be changed, combined into composite steps or actions, and/or separated into sub-steps or sub-actions to provide features described herein.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method of selecting an access point in a wireless communications network, comprising:
    detecting, at a wireless device, a plurality of beacons, each beacon corresponding to one of a plurality of access points and specifying a frequency band in which the respective access point operates and a data rate supported by the respective access point;
    for each access point of the plurality, calculating a speed score based on each of the specified frequency band in which the respective access point operates, the specified data rate supported by the respective access point, a received signal strength indicator (RSSI) associated with the respective access point, and a number of access points and client devices connected to a channel associated with the respective access point; and
    selecting, based on the speed score, an access point of the plurality; and
    connecting the wireless device to the selected access point.

2. The method of claim 1, further including:
    calculating, at the wireless device, the RSSI based on an input signal from one or more of the access points of the plurality.

3. The method of claim 1, further including:
    displaying, via a user interface, a Service Set Identifier (SSI) associated with each access point of the plurality; and
    displaying, via the user interface, the speed score associated with each SSI.

4. The method of claim 3, further including:
    receiving, via the user interface, a user input selecting the access point, wherein the selecting is based on the user input.

5. The method of claim 1, wherein an access point operates in the 2.4 GHz, 5 GHz, or 60 GHz frequency band.

6. A system for selecting an access point in a wireless communications network, comprising:
    a transceiver that detects a plurality of beacons, wherein each beacon corresponds to one of a plurality of access points and specifies a frequency band in which the respective access point operates and a data rate supported by the respective access point;
    a memory; and
    one or more processors coupled to the memory and the transceiver, wherein the one or more processors is configured to for each access point of the plurality, calculate a speed score based on each of the specified frequency band in which the respective access point operates, the specified data rate supported by the respective access point, an RSSI associated with the respective access point, and a number of access points and client devices connected to a channel associated with the respective access point, wherein one or more processors is configured to select, based on the speed score, an access point of the plurality, wherein the transceiver connects the wireless device to the selected access point.

7. The system of claim 6, wherein the transceiver receives an input signal from one or more of the access points of the plurality, and wherein for one or more access points of the plurality, the one or more processors is configured to calculate the RSSI based on each input signal.

8. The system of claim 7, further including:
    a user interface that displays a Service Set Identifier (SSI) associated with each access point of the plurality and that displays the speed score associated with each SSI.

9. The system of claim 8, wherein the user interface receives a user input selecting the access point, and wherein the one or more processors is configured to select the access point based on the user input.

10. The system of claim 6, wherein an access point operates in the 2.4 frequency band.

11. A computer-readable medium having stored thereon computer-executable instructions for performing operations, comprising:
    detecting, at a wireless device, a plurality of beacons, each beacon corresponding to one of a plurality of access points and specifying a frequency band in which the respective access point operates and a data rate supported by the respective access point;
    for each access point of the plurality, calculating a speed score based on each of the specified frequency band in which the respective access point operates, the specified data rate supported by the respective access point, a received signal strength indicator (RSSI) associated with the respective access point, and a number of access points and client devices connected to a channel associated with the respective access point; and
    selecting, based on the speed score, an access point of the plurality; and connecting the wireless device to the selected access point.

12. The method of claim 1, wherein the selected access point has a weaker RSSI than another access point of the plurality of access point.

13. The method of claim 1, wherein a plurality of access points is connected to one or more channels of the plurality of channels.

14. The system of claim 6, wherein the plurality of access points is connected to one or more channels of the plurality of channels.

15. The method of claim 1, further including:
for each access point of the plurality, calculating a signal-to-noise (SNR) ratio associated with the respective access point.

16. The method of claim 15, wherein the SNR ratio is based on a packet error rate associated with the respective access point.

17. The method of claim 15, wherein calculating the speed score includes calculating the speed score based on the respective SNR ratio.

18. The method of claim 1, wherein the frequency band includes a plurality of non- overlapping channels.

19. The system of claim 6, wherein an access point operates in the 5 GHz frequency band.

20. The system of claim 6, wherein an access point operates in the 60 GHz frequency band.

\* \* \* \* \*